United States Patent [19]

Martuscello et al.

[11] Patent Number: 4,907,896
[45] Date of Patent: Mar. 13, 1990

[54] TEMPERATURE MEASURING DEVICE

[75] Inventors: Peter J. Martuscello; Philip J. Rittenhouse, both of Corning, N.Y.

[73] Assignee: Corning Incorporated, Corning, N.Y.

[21] Appl. No.: 328,456

[22] Filed: Mar. 24, 1989

[51] Int. Cl.$^4$ .............................................. G01K 5/08
[52] U.S. Cl. ........................................ 374/190; 65/62; 374/193
[58] Field of Search ............... 374/190, 192, 105, 193; 65/62

[56] References Cited

U.S. PATENT DOCUMENTS

| 2,614,431 | 10/1952 | Brady | 374/190 X |
| 2,712,237 | 7/1955 | Margolis | 374/105 |
| 3,218,861 | 11/1965 | Moore et al. | 374/190 |
| 3,739,642 | 6/1973 | Klinger | 374/193 |

Primary Examiner—Daniel M. Yasich
Attorney, Agent, or Firm—Clinton S. Janes, Jr.; Milton M. Peterson

[57] ABSTRACT

There is disclosed a maximum reading, temperature measuring device, such as a clinical thermometer, composed of a bulb containing an expandable liquid, such as mercury, an elongated tube with a central bore into which the liquid expands when heated, and a flow control member positioned intermediate the tube and bulb and sealed to each. The flow control member is a short length of tubing having a central bore that is sufficiently small in diameter to form a constriction that inhibits reverse flow of the liquid.

7 Claims, 1 Drawing Sheet

TEMPERATURE MEASURING DEVICE

FIELD OF THE INVENTION

This invention is concerned with a maximum reading, temperature measuring device, and a clinical thermometer in particular.

BACKGROUND OF THE INVENTION

A maximum reading device for measuring temperature requires some means for storing or retaining the maximum value until it can be read. In producing clinical thermometers, it is current practice to modify the thermometer tube to inhibit return flow of the liquid until desired. This has taken the form of a constriction in the bore of the thermometer tube.

Forming of the constriction has not lent itself to a machine operation. Rather, it has required a high level of manual skill, and frequently a considerable amount of reworking to obtain a successful product.

PURPOSES OF THE INVENTION

A basic purpose is to provide an improved clinical thermometer.

A further purpose is to provide a thermometer construction that is easier to produce, and that does not require highly skilled manual operations.

A particular purpose is to provide a thermometer with a separately formed flow control member.

Another purpose is to provide a thermometer construction such that a plurality of flow control members of essentially uniform characteristics may be produced at one time.

SUMMARY OF THE INVENTION

In fulfillment of these and other useful purposes, our invention resides in a maximum reading, temperature measuring device composed of a bulb containing a thermally expandable liquid, an elongated tube having a central bore into which the liquid expands when heated, and a flow control member positioned intermediate the bulb and tube and being hermetically sealed to each, the flow control member being a short length of tubing having a central bore opening into both the tube and the bulb, and being of sufficiently smaller diameter than the tube bore so that normal reverse flow of the liquid is inhibited.

In preferred embodiments, the device is a clinical thermometer, the parts are formed from glass tubing, the expandable liquid is mercury, and the outer diameter of the flow control member is slightly smaller than the inside diameter of the bulb so that the member fits within and is sealed to the bulb.

PRIOR ART

The following U.S. Patents show various devices for inhibiting reverse flow in maximum reading thermometers:

U.S. Pat. No. 2,447,888 (Young) shows a construction wherein a fiber is inserted in the bore of a tube to restrict effective bore size.

U.S. Pat. No. 3,717,035 (Klingler, et al.) provides a rotatable valve, in the nature of an open and close plug, projecting transversely through a plastic thermometer tube.

U.S. Pat. No. 3,872,729 (Ayres) discloses a clinical thermometer wherein the conventional constriction is eliminated by coating the thermometer capillary with an adhesive to retain the liquid.

U.S. Pat. No. 3,950,994 (Gart) discloses a movable, flow control member adapted to be inserted in a thermometer cavity to permit flow in one position, and to block flow in a second position. Optionally, nodules may be provided on the inside of either the thermometer tube or the control member to form a constriction.

DETAILED DESCRIPTION OF THE INVENTION

Figure 1:
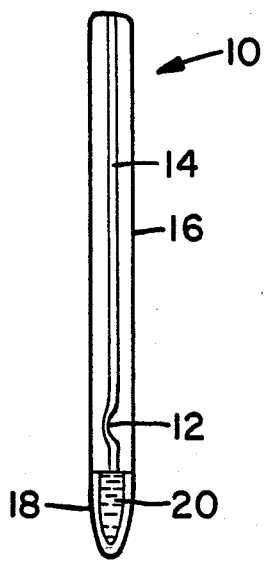
FIG. 1 is a front view of a clinical thermometer illustrating prior commercial construction.
Figure 2:
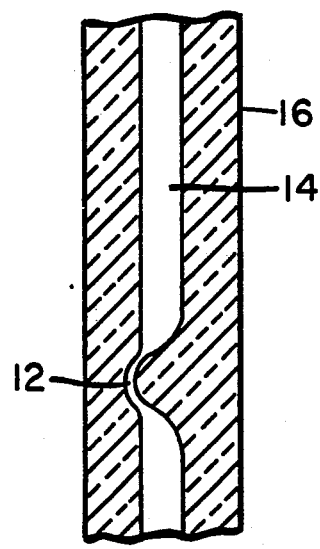
FIG. 2 is an enlarged, fragmentary, front view of a portion of the thermometer tube bore of FIG. 1.

FIG. 1 illustrates a conventional mercury thermometer 10 having a constriction 12 located in the lower portion of the capillary bore 14 of thermometer tube 16. FIG. 2 is an enlarged view of that portion of the inside wall of thermometer tube 16 that embodies constriction 12. In a typical construction, bore 14 may have an oval configuration about 0.08 mm. across the minor axis and 0.23 mm. across the major axis. Constriction 12, in contrast, may be generally circular and have a diameter on the order of 0.01 to 0.04 mm. Thus, the ratio of bore sizes will be greater than about 10:1.

Bulb 18 contains a thermally expandable liquid 20 typically mercury. As the temperature of the bulb, and consequently the mercury, is increased, the mercury expands into the capillary of tube 16 and past constriction 12 to a point corresponding to the temperature being measured. Graduation marks, or a scale, may be provided on the thermometer tube to enable reading the temperature being measured.

Upon subsequent cooling, the mercury above the constriction in the capillary is held at the maximum level attained until released by shaking or centrifuging. This is due to the capillary attraction in the minute bore of the constriction overcoming the normal tendency to flow back to the bulb.

It is well recognized that a constriction, such as shown at 12, is very difficult to form, and has been a major contributor to the cost of maximum reading thermometers. Accordingly, numerous alternatives have been proposed as illustrated in the PRIOR ART section, supra. Nevertheless, use of a constricted capillary, such as illustrated in FIGS. 1 and 2, has continued.

Figure 3:
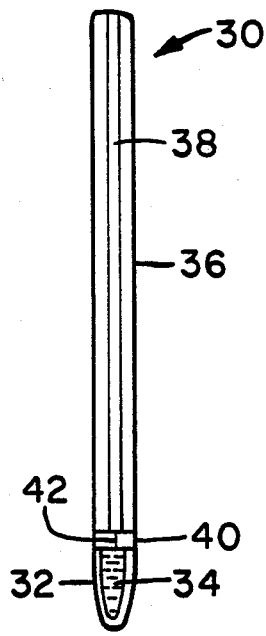
FIG. 3 is a front view of a clinical thermometer in accordance with the present invention.
Figure 4:
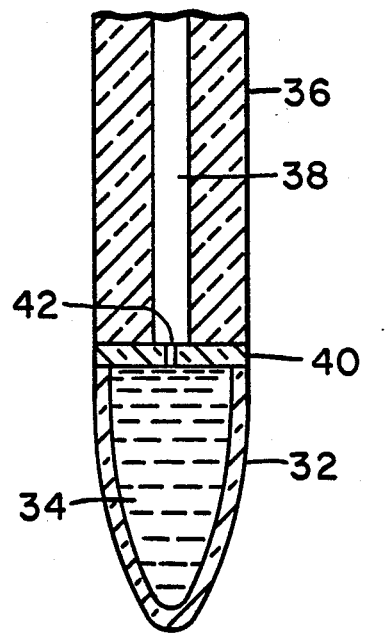
FIG. 4 is an enlarged, fragmentary front view of the bottom portion of FIG. 3.

FIGS. 3 and 4 illustrate our simplified construction 30. This construction is composed of three separate elements, a bulb portion 32 containing an expandable liquid 34, such as mercury, an elongated tube 36 having a capillary bore 38, and a flow control member 40. These three elements of our thermometer are formed separately, and then hermetically sealed together, as by flame sealing or by cementing.

Thermometer 30 retains the basic principle of a constriction, but in a simplified manner. Constriction 42 is located in flow control member 40, preferably centrally located therein. Flow control member 40 may be produced from a drawn glass tube. The bore of the tubing is controlled to correspond to the desired size of constriction 42, which may be up to about 0.05 mm. in diameter. The glass tube may be sawn transversely to produce a plurality of flow control members 40. This enables close control of bore size in the glass tubing in a relatively simple manner. In turn, constriction 42 may be provided without the high degree of skill otherwise required, and without the inevitable low selection and consequent increased cost.

In a preferred embodiment, the outside diameter of flow control device 40 is just slightly smaller than the inside diameter of bulb 32. Thus, member 40 may fit within bulb 32, and be either fusion sealed or cemented to the inner wall thereof.

While not functionally necessary, it is generally simpler to produce glass tubes with centrally located bores. Further, this insures the requisite communication of constriction 42 and the capillary 38 of tube 36.

We claim:

1. In a maximum reading, temperature measuring device having a bulb containing a thermally expandable liquid, and an elongated tube having a central bore into which the liquid expands when heated, the improvement comprising a flow control member of essentially uniform characteristics and positioned intermediate the tube and the bulb and sealed to each, the flow control member being a short length of tubing having a central bore opening into both the tubing and the bulb, said bore being of a controlled size that is sufficiently smaller than that of the elongated tube so that normal reverse flow of the liquid is inhibited.

2. A temperature measuring device in accordance with claim 1 that is a clinical thermometer.

3. A temperature measuring device in accordance with claim 1 wherein the outer diameter of the flow control member is slightly smaller than the inside diameter of the bulb so that if fits within the bulb and is sealed to the inside wall thereof.

4. A temperature measuring device in accordance with claim 1 wherein the thermally expandable liquid is mercury.

5. A temperature measuring device in accordance with claim 1 wherein the bore of the flow control member is not over about 0.05 mm. in diameter.

6. A temperature measuring device in accordance with claim 1 wherein each member is composed of glass.

7. A maximum reading, temperature measuring device composed of a bulb containing a thermally expandable liquid, an elongated tube having a central bore into which the liquid expands when heated, and a flow control member of essentially uniform characteristics and positioned intermediate the tube and the bulb and sealed to each, the flow control member being a short length of tubing having a central bore opening into both the tube and the bulb, said bore being of a controlled size that is sufficiently smaller in size than that of the elongated tube so that normal reverse flow of the liquid is inhibited.

* * * * *